(12) United States Patent  (10) Patent No.: US 8,524,819 B2
Kimura et al.  (45) Date of Patent: Sep. 3, 2013

(54) THERMOPLASTIC POLYMER COMPOSITION AND PRODUCTION METHOD THEREOF

(75) Inventors: Kenji Kimura, Funabashi (JP); Natsuko Sato, Sakai (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 181 days.

(21) Appl. No.: 12/786,745

(22) Filed: May 25, 2010

(65) Prior Publication Data
US 2010/0311883 A1  Dec. 9, 2010

(30) Foreign Application Priority Data

Jun. 4, 2009 (JP) ................. 2009-134840

(51) Int. Cl.
*C08K 5/00* (2006.01)
(52) U.S. Cl.
USPC ......................................... 524/291; 524/151
(58) Field of Classification Search
USPC ........................................................ 524/291
See application file for complete search history.

(56) References Cited

U.S. PATENT DOCUMENTS

| | | | |
|---|---|---|---|
| 4,774,274 A | | 9/1988 | Takata et al. |
| 5,047,461 A | * | 9/1991 | Takata et al. .................. 524/291 |
| 5,128,398 A | * | 7/1992 | Sasaki et al. .................. 524/291 |
| 2009/0043027 A1 | | 2/2009 | Kimura et al. |

FOREIGN PATENT DOCUMENTS

| | | |
|---|---|---|
| EP | 322166 A1 * | 6/1989 |
| EP | 2 017 299 A1 | 1/2009 |
| EP | 2 085 359 A1 | 6/2009 |
| EP | 2 085 423 A2 | 8/2009 |
| EP | 2 154 189 A1 | 2/2010 |
| JP | 9-143222 A | 6/1997 |

OTHER PUBLICATIONS

European Search Report for corresponding European Patent Application No. 10164252, dated Sep. 13, 2010.
Examination Report for corresponding Singapore Patent Application No. 201003649-9, dated Feb. 2, 2011.
Search Report for corresponding Sinaporean Patent Application No. 201003649-9, dated Feb. 2, 2011.

* cited by examiner

*Primary Examiner* — Ling Choi
*Assistant Examiner* — Hui Chin
(74) *Attorney, Agent, or Firm* — Birch, Stewart, Kolasch & Birch, LLP

(57) ABSTRACT

A thermoplastic polymer composition comprising a thermoplastic polymer, a compound of the formula (1):

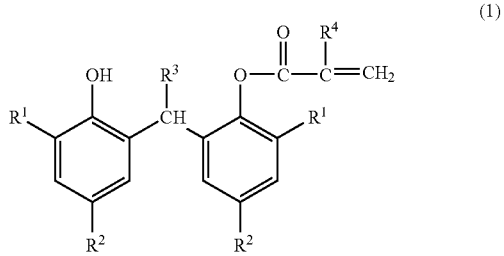

(1)

(wherein, $R^1$ and $R^2$ represent each independently an alkyl group having 1 to 8 carbon atoms, an aryl group having 6 to 12 carbon atoms or an aralkyl group having 7 to 18 carbon atoms, $R^3$ represents an alkyl group having 1 to 3 carbon atoms, and $R^4$ represents a hydrogen atom or methyl group), and a hydrocarbon, wherein 0.001 to 3 parts by weight of the compound of the formula (1) and 0.0005 to 0.008 parts by weight of the hydrocarbon are contained with respect to 100 parts by weight of the thermoplastic polymer.

3 Claims, No Drawings

THERMOPLASTIC POLYMER COMPOSITION AND PRODUCTION METHOD THEREOF

TECHNICAL FIELD

The present invention relates to a thermoplastic polymer composition and a production method thereof.

BACKGROUND ART

Thermoplastic polymers are widely used for food packaging vessels and daily miscellaneous goods since they are excellent in transparency and also have good impart resistance. These thermoplastic polymers, however, have a problem of deterioration of processing stability such as lowering of flowability and generation of a fisheye gel in molding processing, and the like.

As the thermoplastic polymer composition excellent in processing stability, there is a suggestion on a thermoplastic polymer composition (patent document 1) containing 2-[1-(2-hydroxy-3,5-di-t-pentylphenyl)ethyl]-4,6-di-t-pentylphenyl acrylate and 2,4-di-t-amyl-6-[1-(3,5-di-t-amyl-2-hydroxyphenyl)ethyl]phenyl acrylate in a polybutadiene rubber which is a kind of thermoplastic polymer.

[patent document 1] JP-A No. 1-168643 (example)

DISCLOSURE OF THE INVENTION

Recently, a thermoplastic polymer composition having further improved processing stability is required.

The present inventors have investigated thermoplastic polymer compositions for solving such a problem, resultantly leading to completion of the present invention.

That is, the present invention provides the following [1] to [5].

[1] A thermoplastic polymer composition comprising a thermoplastic polymer, a compound of the formula (1):

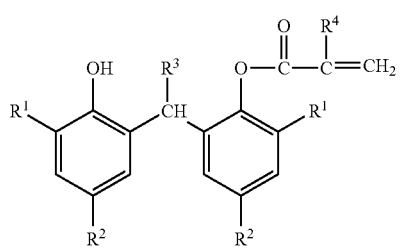

(wherein, $R^1$ and $R^2$ represent each independently an alkyl group having 1 to 8 carbon atoms, an aryl group having 6 to 12 carbon atoms or an aralkyl group having 7 to 18 carbon atoms, $R^3$ represents an alkyl group having 1 to 3 carbon atoms, and $R^4$ represents a hydrogen atom or methyl group), and a hydrocarbon, wherein 0.001 to 3 parts by weight of the compound of the formula (1) and 0.0005 to 0.008 parts by weight of the hydrocarbon are contained with respect to 100 parts by weight of the thermoplastic polymer.

[2] The composition according to [1] wherein the compound of the formula (1) is 2-[1-(2-hydroxy-3,5-di-t-pentylphenyl)ethyl]-4,6-di-t-pentylphenyl acrylate or 2-t-butyl-6-(3-t-butyl-2-hydroxy-5-methylbenzyl)-4-methylphenyl acrylate. [3] The composition according to [1] or [2] wherein the hydrocarbon is an aliphatic hydrocarbon having 5 to 8 carbon atoms or an alicyclic hydrocarbon having 5 to 8 carbon atoms. [4] A method for producing a thermoplastic polymer composition comprising a thermoplastic polymer, a compound of the formula (1):

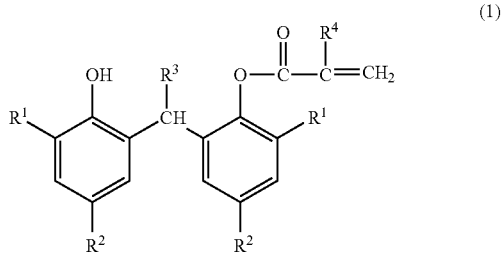

(wherein, $R^1$ and $R^2$ represent each independently an alkyl group having 1 to 8 carbon atoms, an aryl group having 6 to 12 carbon atoms or an aralkyl group having 7 to 18 carbon atoms, $R^3$ represents an alkyl group having 1 to 3 carbon atoms, and $R^4$ represents a hydrogen atom or methyl group), and a hydrocarbon, wherein the method comprises a first step in which a monomer constituting the thermoplastic polymer is solution-polymerized or suspension-polymerized in the hydrocarbon to obtain the thermoplastic polymer, a second step in which the compound of the above-described formula (1) is dissolved in the hydrocarbon, a third step in which the solution obtained in the above-described second step is mixed in a mixture of the hydrocarbon and the thermoplastic polymer obtained in the above-described first step so that the content of the compound of the above-described formula (1) is 0.001 to 3 parts by weight with respect to 100 parts by weight of the thermoplastic polymer, and a fourth step in which the hydrocarbon is removed from the mixture of the thermoplastic polymer, the hydrocarbon and the compound of the above-described formula (1) obtained in the above-described third step so as to adjust the content of the hydrocarbon in the resulting thermoplastic polymer composition to 0.0005 to 0.008 parts by weight with respect to 100 parts by weight of the thermoplastic polymer.

[5] The thermoplastic polymer composition according to any one of [1] to [3] wherein the composition is in the form of granule.

MODES FOR CARRYING OUT THE INVENTION

The present invention will be illustrated in detail below.

The thermoplastic polymer composition of the present invention contains the compound of the above-described formula (1) (hereinafter, referred to as compound (1) in some cases.) in an amount of 0.001 to 3 parts by weight, preferably 0.02 to 2 parts by weight, more preferably 0.05 to 1 part by weight, further more preferably 0.1 to 0.5 parts by weight with respect to 100 parts by weight of the thermoplastic polymer. When the content of the compound (1) is 0.001 part by weight or more, there is a preferable tendency of improvement in processing stability, and when 3 parts by weight or less, there is a preferable tendency that a phenomenon of floating of the compound (1) from the resulting thermoplastic polymer composition, so-called bleeding out, scarcely occurs.

Examples of $R^1$ and $R^2$ in the formula of the compound (1) include, independently of one another, alkyl groups having 1 to 8 carbon atoms such as a methyl group, ethyl group, n-propyl group, isopropyl group, n-butyl group, isobutyl group, sec-butyl group, t-butyl group, n-pentyl group, t-amyl group (—C(CH$_3$)$_2$CH$_2$CH$_3$), 2-ethylhexyl group, cyclohexyl group and the like;

aryl groups having 6 to 12 carbon atoms such as a phenyl group and the like;

aralkyl groups having 7 to 18 carbon atoms such as a benzyl group and the like; etc.

Preferably mentioned are alkyl groups having a tertiary carbon atom such as a t-butyl group and a t-amyl group and the like, and more preferable are a t-amyl group and the like.

Examples of R$^3$ include alkyl groups having 1 to 3 carbon atoms such as a methyl group, ethyl group, n-propyl group, isopropyl group and the like, more preferably a methyl group and the like.

R$^4$ represents a hydrogen atom or methyl group, and particularly, a hydrogen atom is preferable.

Examples of the compound (1) include 2-[1-(2-hydroxy-3,5-di-t-pentylphenyl)ethyl]-4,6-di-t-pentylphenyl acrylate, 2-t-butyl-6-(3-t-butyl-2-hydroxy-5-methylbenzyl)-4-methylphenyl acrylate, 2,4-di-t-butyl-6-[1-(3,5-di-t-butyl-2-hydroxyphenyl)ethyl]phenyl acrylate, 2-t-butyl-6-[1-(3-t-butyl-2-hydroxy-5-methylphenyl)ethyl]-4-methylphenyl acrylate, 2-t-butyl-6-[1-(3-t-butyl-2-hydroxy-5-methylphenyl)propyl]-4-methylphenyl acrylate, 2-t-butyl-6-[1-(3-t-butyl-2-hydroxy-5-propylphenyl)ethyl]-4-propylphenyl acrylate, 2-t-butyl-6-[1-(3-t-butyl-2-hydroxy-5-isopropylphenyl)ethyl]-4-isopropylphenyl acrylate and the like, and preferable is 2-[1-(2-hydroxy-3,5-di-t-pentylphenyl)ethyl]-4,6-di-t-pentylphenyl acrylate or 2-t-butyl-6-(3-t-butyl-2-hydroxy-5-methylbenzyl)-4-methylphenyl acrylate.

2-[1-(2-hydroxy-3,5-di-t-pentylphenyl)ethyl]-4,6-di-t-pentylphenyl acrylate is commercially available as Sumilizer GS(F) (registered trademark, manufactured by Sumitomo Chemical Co., Ltd., hereinafter, referred to as compound (1-1) in some cases).

The thermoplastic polymer composition of the present invention contains the hydrocarbon in an amount of 0.0005 to 0.008 parts by weight, preferably 0.001 to 0.007 parts by weight, more preferably 0.0015 to 0.006 parts by weight with respect to 100 parts by weight of the thermoplastic polymer.

When the content of the hydrocarbon is 0.0005 parts by weight or more, there is a preferable tendency of improvement in processing stability, and when 0.008 parts by weight or less, there is a preferable tendency that when the thermoplastic polymer composition is granulated into pellets and the like, a blocking property of mutual adhesion of the resultant granulated materials is lowered. It is preferred for the hydrocarbon to be a hydrocarbon which is liquid under atmospheric pressure and at 20° C.

Examples of the hydrocarbon to be used in the present invention include aliphatic hydrocarbons having 5 to 8 carbon atoms such as n-pentane, isopentane, n-octane, 2-ethylhexyl and the like;

alicyclic hydrocarbons such as cyclopentane, methylcyclopentane, cyclohexane, methylcyclohexane, cycloheptane, methylcycloheptane and the like;

aromatic hydrocarbons such as benzene, toluene, xylene, ethylbenzene and the like; etc.

The hydrocarbons may be used singly or in admixture of two or more.

The hydrocarbons include preferably aliphatic hydrocarbons having 5 to 8 carbon atoms and alicyclic hydrocarbons having 5 to 8 carbon atoms, more preferably n-hexane and cyclohexane.

Examples of the thermoplastic polymer to be used in the present invention include polypropylene type resins such as an ethylene-propylene copolymer and the like; polyethylene type resins (high density polyethylene (HD-PE), low density polyethylene (LD-PE), linear low density polyethylene (LL-DPE) and the like); methylpentene polymer, ethylene-ethyl acrylate copolymer, ethylene-vinyl acetate copolymer; polystyrenes (polystyrene such as poly(p-methylstyrene), poly(α-methylstyrene) and the like, and acrylonitrile-styrene copolymer, acrylonitrile-butadiene-styrene copolymer, special acrylic rubber-acrylonitrile-styrene copolymer, acrylonitrile-chlorinated polyethylene-styrene copolymer, styrene-butadiene copolymer and the like); chlorinated polyethylene, polychloroprene, chlorinated rubber, polyvinyl chloride, polyvinylidene chloride, methacrylic resin, ethylene-vinyl alcohol copolymer, fluorine resin, polyacetal, grafted polyphenylene ether resin, polyphenylene sulfide resin, polyurethane, polyamide; polyester resins (for example, polyethylene terephthalate, polybutylene terephthalate and the like); polycarbonate, polyacrylate, polysulfone, polyether ether ketone, polyether sulfone, aromatic polyester resins, diallyl phthalate prepolymer, silicone resin, 1,2-polybutadiene, polyisoprene, butadiene/acrylonitrile copolymer, ethylene-methyl methacrylate copolymer, and the like.

Preferable thermoplastic polymers include thermoplastic polymers obtained by solution polymerization or suspension polymerization using a hydrocarbon as a solvent, specifically, a styrene-butadiene copolymerized resin, acrylonitrile-butadiene-styrene resin, polypropylene type resin, acrylonitrile-butadiene-styrene copolymer, styrene-butadiene copolymer and the like.

The method for producing a thermoplastic polymer composition of the present invention includes 1) a production method comprising a first step in which a monomer constituting a thermoplastic polymer is solution-polymerized or suspension-polymerized in a hydrocarbon to obtain a thermoplastic polymer, a second step in which a compound of the above-described formula (1) is dissolved in a hydrocarbon, a third step in which the dissolved solution obtained in the above-described second step is mixed in a mixture of the hydrocarbon and the thermoplastic polymer obtained in the above-described first step so that the content of the compound of the above-described formula (1) is 0.001 to 3 parts by weight with respect to 100 parts by weight of the thermoplastic polymer, and a fourth step in which the hydrocarbon is removed from the mixture of the thermoplastic polymer, the hydrocarbon and the compound of the above-described formula (1) obtained in the above-described third step so as to adjust the content of the hydrocarbon in the resulting thermoplastic polymer composition to 0.0005 to 0.008 parts by weight with respect to 100 parts by weight of the thermoplastic polymer;

2) A Production Method Comprising a step in which 0.001 to 3 parts by weight of the compound of the above-described formula (1) and 0.0005 to 0.008 parts by weight of the hydrocarbon are mixed with respect to 100 parts by weight of a thermoplastic polymer separately prepared;

and the like.

As the method for producing a thermoplastic polymer composition of the present invention, the above-described method 1) is preferable. The method 1) will be described in detail below.

In the first step, it is preferable that after completion of solution polymerization or suspension polymerization, a polymerization catalyst is de-activated with methanol and the like.

More specifically, examples of the third step include a method of dry blending the thermoplastic polymer and the compound (1), a method in which the compound (1) is dissolved with a hydrocarbon to obtain a solution, and the solution is mixed in a mixture of the thermoplastic polymer and hydrocarbon; and the like.

Examples of the method of adjusting the content of the hydrocarbon in the fourth step include i) a method in which the hydrocarbon is removed by distillation under reduced pressure and the like from the mixture obtained via the above-described steps 1 to 3 so that the content of the hydrocarbon becomes 0.0005 to 0.008 parts by weight with respect to 100 parts by weight of the thermoplastic polymer;

ii) a method in which the hydrocarbon is removed by distillation under reduced pressure and the like from the mixture obtained via the above-described steps 1 to 3 so that the content of the hydrocarbon becomes 0.008 parts by weight or more, preferably about 0.01 to 1 part by weight with respect to 100 parts by weight of the thermoplastic polymer, then, the resultant mixture after distillation is molded into granular materials such as pellets and the like, then, the resultant granular materials are subjected to vacuum distillation, drying under reduced pressure, drying in vacuo and the like to remove the hydrocarbon so that the content of the hydrocarbon becomes 0.0005 to 0.008 parts by weight with respect to 100 parts by weight of the thermoplastic polymer;

and the like.

Here, it is preferable that removal of the hydrocarbon in the fourth step is carried out at 100° C. or lower.

The thermoplastic polymer composition of the present invention is excellent in processing stability.

The granular thermoplastic polymer composition obtained by the method of the above-described fourth step ii), and the granular thermoplastic polymer composition obtained by granulation with stirring, extrusion molding and the like at a temperature of 100° C. or lower of the thermoplastic polymer composition obtained by the method of the above-described fourth step i) shows a tendency of reduction of a blocking property of mutual adhesion of the granular thermoplastic polymer compositions.

Here, the granular means a shape of circular cylinder, plate, flake, rod, disc, approximate sphere, approximate hemisphere or the like, and the weight of one particle of the granular thermoplastic polymer composition is usually 5 mg to 1000 mg, preferably, 10 mg to 500 mg, more preferably 10 mg to 20 mg.

The thermoplastic polymer composition of the present invention may contain additives other than the compound (1) and the hydrocarbon, in a range not disturbing the effect of the present invention.

Examples of the above-described additives include an antioxidant, ultraviolet absorber, photostabilizer, metal deactivator, nucleating agent, lubricant, antistatic agent, flame retardant, filler, pigment, inorganic filler and the like, other than the compound (1) and the hydrocarbon Examples of the phenol type antioxidant as one example of the antioxidant include alkylated monophenols such as 2,6-di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, 2,4-dimethyl-6-(1'-methyltridecyl-1'-yl)phenol and mixtures thereof, and the like, alkylthiomethylphenols such as 2,4-dioctylthiomethyl-6-t-butylphenol, 2,4-dioctylthiomethyl-6-methylphenol, 2,4-dioctylthiomethyl-6-ethylphenol, 2,6-didodecyl-thiomethyl-4-nonylphenol and mixtures thereof, and the like, alkylidenebisphenol and derivatives thereof such as 2,2'-methylenebis(4-methyl-6-t-butylphenol), 2,2'-methylenebis (4-ethyl-6-tbutylphenol), 2,2'-methylenebis[4-methyl-6-(α-methylcyclohexyl)phenol], 2,2'-methylenebis(4-methyl-6-cyclohexylphenol), 2,2'-methylenebis(4-methyl-6-nonylphenol), 2,2'-methylenebis(4,6-di-t-butylphenol), 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 2,6-bis(3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecyl-mercaptobutane, ethylene glycol bis[3,3-bis-3'-t-butyl-4'-hydroxyphenyl] butyrate, bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl] terephthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecyl-mercaptobutane, 1,1,5,5-tetra(5-t-butyl-4-hydroxy-2-methylphenyl)pentane and mixtures thereof, and the like, acylaminophenol derivatives such as 4-hydroxylauric anilide, 4-hydroxystearic anilide, octyl-N-(3,5-di-t-butyl-4-hydroxyphenyl) carbanate and mixtures thereof, and the like, acylaminophenol derivatives such as 4-hydroxylauric anilide, 4-hydroxystearic anilide, octyl-N-(3,5-di-t-butyl-4-hydroxyphenyl) carbanate and mixtures thereof, and the like, esters of β-(3,5-di-t-butyl-4-hydroxyphenyl)propionic acid with a monohydric or polyhydric alcohol such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, Spiro glycol, triethylene glycol, pentaerythritol, tris(hydroxy-ethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof, and the like, hydroxylated thiodiphenyl ethers such as 2,2'-thiobis(6-t-butylphenol), 2,2'-thiobis(4-methyl-6-t-butylphenol), 2,2'-thiobis(4-octylphenol), 4,4'-thiobis(3-methyl-6-t-butylphenol), 4,4'-thiobis(2-methyl-6-t-butylphenol), 4,4'-thiobis(3,6-di-t-amyl-phenol), 4,4'-(2,6-dimethyl-4-hydroxyphenyl) disulfide and the like, benzyl derivatives such as O-benzyl derivatives, N-benzyl derivatives, S-benzyl derivatives and the like such as 3,5,3',5'-tetrat-butyl-4,4'-dihydroxydibenzyl ether, octadecyl-4-hydroxy-3,5-dimethylbenzyl mercaptoacetate, tris(3,5-di-t-butyl-4-hydroxybenzyl)amine, bis(4-t-butyl-3-hydroxy-2,6-dimethylbenzyl)dithioterephthalate, bis(3,5-di-t-butyl-4-hydroxybenzyl)sulfide, isooctyl-3,5-di-t-butyl-4-hydroxybenzyl mercaptoacetate and mixtures thereof, and the like, triazine derivatives such as 2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butyl-phenoxy)-1,3,5-triazine, 2,4,6-tris(3,5-di-t-butyl-4-phenoxy)-1,3,5-triazine, tris(4-t-butyl-3-hydroxy-2,6-dimethylbenzyl)isocyanurate, tris(3,5-di-t-butyl-4-hydroxybenzyl)isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl)isocyanurate, tris[2-(3',5'-di-t-butyl-4'-hydroxycinnamoyloxy)ethyl] isocyanurate and mixtures thereof, and the like, hydroxybenzylated malonate derivatives such as dioctadecyl-2,2-bis(3,5-di-t-butyl-2-hydroxybenzyl)malonate, dioctadecyl-2-(3-t-butyl-4-hydroxy-5-methylbenzyl)malonate, didodecylmercaptoethyl-2,2-bis(3,5-di-t-butyl-4-hydroxybenzyl)malonate, bis[4-(1,1,3,3-tetramethylbutyl)phenyl]-2,2-bis(3,5-di-t-butyl-4-hydroxybenzyl)malonate and mixtures thereof, and the like, aromatic hydroxybenzyl derivatives such as 1,3,5-trimethyl-2,4,6-tris(3,5-di-t-butyl-4-hydroxybenzyl)benzene, 1,4-bis(3,5-di-t-butyl-4-hydroxybenzyl)-2,3,5,6-tetramethylbenzene, 2,4,6-tris(3,5-t-butyl-4-hydroxybenzyl)phenol and mixtures thereof, and the like, benzyl phosphonate derivatives such as dimethyl-3,5-di-t-butyl-4-hydroxybenzyl phosphonate, diethyl-3,5-di-t-butyl-4-hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calcium salt of 3,5-di-t-butyl-4-hydroxybenzylphosphonic acid monoester and mixtures thereof, and the like, esters of β-(5-t-butyl-4-hydroxy-3-methylphenyl)propionic acid with a monohydric or polyhydric alcohol such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxy-methyl-1-phospha-2,6,7-trioxabicyclo[2,2,2]octane and mixtures thereof, and the like, esters of β-(3,5-dicyclohexyl-4-hydroxyphenyl)propionic acid with a monohydric or polyhydric alcohol such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxy-methyl-1-phospha-2,6,7-trioxabicyclo[2,2,2]octane and mixtures thereof, and the like, esters of 3,5-di-t-butyl-4-hydroxyphenylacetic acid with a monohydric or polyhydric alcohol such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxy-ethyl)isocyanurate, N,N'-bis(hydroxy-ethyl)oxamide, 3-thiaundecanol, 3-thiapentadecanol, trimethylhexanediol, trimethylolpropane, 4-hydroxy-methyl-1-phospha-2,6,7-trioxabicyclo[2,2,2]octane and mixtures thereof, and the like, amides of β-(3,5-di-t-butyl-4-hydroxyphenyl)propionic acid such as N,N'-bis[3-(3',5'-di-t-butyl-4'-hydroxyphenyl)propionyl]hydrazine, N,N'-bis[3-(3',5'-di-t-butyl-4'-hydroxyphenyl)propionyl]hexamethylenediamine, N,N'-bis[3-(3',5'-di-t-butyl-4'-hydroxyphenyl)propionyl]trimethylenediamine and mixtures thereof, and the like, Tocopherols such as α-tocopherol, β-tocopherol, γ-tocopherol, δ-tocopherol and mixtures thereof, and the like.

Examples of the hydroquinone and alkylated hydroquinone antioxidant include 2,6-di-t-butyl-4-methoxyphenol, 2,5-di-t-butyl-hydroquinone, 2,5-di-t-amyl-hydroquinone, 2,6-diphenyl-4-octadecyloxyphenol, 2,6-di-t-butyl-hydroquinone, 2,5-di-t-butyl-4-hydroxyanisole, 3,5-di-t-butyl-4-hydroxyphenyl stearate, bis(3,5-di-t-butyl-4-hydroxyphenyl) adipate and mixtures thereof, and the like.

Examples of the sulfur-based antioxidant include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayltetrakis(3-lauryl thiopropionate) and the like.

Examples of the phosphorus-based antioxidant include triphenyl phosphite, tris(nonylphenyl)phosphite, tris(2,4-di-t-butylphenyl)phosphite, trilauryl phosphite, trioctadecyl phosphite, distearyl pentaerythritol diphosphite, diisodecyl pentaerythritol diphosphite, bis(2,4-di-t-butylphenyl)pentaerythritol diphosphite, bis(2,4-di-t-butyl-6-methylphenyl) pentaerythritol diphosphite, bis(2,6-di-t-butyl-4-methylphenyl)pentaerythritol diphosphite, bis(2,4,6-tri-t-butylphenyl) pentaerythritol diphosphite, tristearylsorbitol triphosphite, tetrakis(2,4-di-t-butyl-phenyl)-4,4'-diphenylene diphosphonite, 2,2'-methylenebis(4,6-di-t-butylphenyl)-2-ethylhexyl phosphite, 2,2'-ethylidenebis(4,6-di-t-butyl-phenyl)fluorophosphite, bis(2,4-di-t-butyl-6-methylphenyl)ethylphosphite, bis(2,4-di-t-butyl-6-methylphenyl)methylphosphite, 2-(2,4,6-tri-t-butyl-phenyl)-5-ethyl-5-butyl-1,3,2-oxaphosphorinane, 2,2',2'''-nitrilo[triethyltris(3,3',5,5'-tetra-t-butyl-1,1'-biphenyl-2,2'-diyl)phosphite and mixtures thereof, and the like.

Examples of the ultraviolet absorber include salicylate derivatives such as phenyl salicylate, 4-t-butylphenyl salicylate, 2,4-di-t-butyl-phenyl 3',5'-di-t-butyl-4'-hydroxybenzoate, 4-t-octylphenyl salicylate, bis(4-t-butylbenzoyl)resorcinol, benzoylresorcinol, hexadecyl 3',5'-di-t-butyl-4'-hydroxybenzoate, octadecyl 3',5'-di-t-butyl-4'-hydroxybenzoate, 2-methyl-4,6-di-t-butyl-phenyl 3',5'-di-t-butyl-4'-hydroxybenzoate and mixtures thereof, and the like, 2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone and mixtures thereof, and the like, 2-(2'-hydroxyphenyl)benzotriazoles such as 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl) benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy) carbonylethyl]-2'-hydroxyphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-methylphenyl]benzotriazole, 2-(3,5-di-t-butyl-2-hydroxyphenyl)-5-chlorobenzotriazole; mixture of 2-(3'-dodecyl-2'-hydroxy-5'-methylphenyl)benzotriazole and 2-[3'-t-butyl-2'-hydroxy-5'-(2-isooctyloxycarbonylethyl) phenyl]benzotriazole; 2,2'-methylenebis[6-(2H-benzotriazole-2-yl)-4-(1,1,3,3-tetramethylbutyl-)phenol, 2,2'-methylenebis[4-t-butyl-6-(2H-benzotriazole2-yl)phenol];

condensate of poly(3 to 11) (ethylene glycol) with 2-[3'-t-butyl-2'-hydroxy-5'-(2-methoxycarbonylethyl)phenyl]benzotriazole; condensate of poly(3 to 11) (ethylene glycol) with methyl 3-[3-(2H-benzotriazole2-yl)-5-t-butyl-4-hydroxyphenyl] propionate; 2-ethylhexyl 3-[3-t-butyl-5-(5-chloro-2H-benzotriazole2-yl)-4-hydroxyphenyl] propionate, octyl 3-[3-t-butyl-5-(5-chloro-2H-benzotriazole2-yl)-4-hydroxyphenyl] propionate, methyl 3-[3-t-butyl-5-(5-chloro-2H-benzotriazole-2-yl)-4-hydroxyphenyl] propionate, 3-[3-t-butyl-5-(5-chloro-2H-benzotriazole-2-yl)-4-hydroxyphenyl] propionic acid and mixtures thereof, and the like.

Examples of the photostabilizer include hindered amine type photostabilizers such as bis(2,2,6,6-tetramethyl-4-piperidyl) sebacate, bis((2,2,6,6-tetramethyl-4-piperidyl)succinate, bis(1,2,2,6,6-pentamethyl-4-piperidyl) sebacate, bis(N-octoxy-2,2,6,6-tetramethyl-4-piperidyl) sebacate, bis(N-benzyloxy-2,2,6,6-tetramethyl-4-piperidyl) sebacate, bis(N-cyclohexyloxy-2,2,6,6-tetramethyl-4-piperidyl) sebacate, bis(1,2,2,6,6-pentamethyl-4-piperidyl) 2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(1,2,2,6,6-pentamethyl-4-piperidyldecane dioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propionamide, tetrakis(2,2,6,6-tetramethyl-4-piperidyl) 1,2,3,4-butane tetracarboxylate, tetrakis(1,2,2,6,6-pentamethyl-4-piperidyl) 1,2,3,4-butane tetracarboxylate, mixed esterified product of 1,2,3,4-butanetetracarboxylic acid with 1,2,2,6,6-pentamethyl-4-piperidinol and 1-tridecanol, mixed esterified product of 1,2,3,4-butanetetracarboxylic acid with 2,2,6,6-tetramethyl-4-piperidinol and 1-tridecanol; mixed esterified product of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane; mixed esterified product of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane; polycondensate of dimethyl succinate with 1-(2-hydroxy-ethyl)-4-hydroxy-2,2,6,6-tetramethylpiperidine, poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl)imino-1,3,5-triazine-2,4-diyl((2,2,6,6-tetramethyl-4-piperidyl)imino)hexamethylene((2,2,6,6-tetramethyl-4-piperidyl)imino)); polycondensate of N,N'-bis(2,2,6,6-tetramethyl-4-piperidyl)hexamethylenediamine with 1,2-dibromoethane; N,N',4,7-tetrakis[4,6-bis(N-butyl-N-(2,2,6,6-tetramethyl-4-piperidyl)amino)-1,3,5-triazine-2-yl]-4,7-diazadecane-1,10-diamine, N,N',4-tris[4,6-bis(N-butyl-N-(2,2,6,6-tetramethyl-4-piperidyl)amino)-1,3,5-triazine-2-yl]-4,7-diazadecane-1,10-diamine, N,N',4,7-tetrakis[4,6-bis(N-butyl-N-(1,2,2,6,6-pentamethyl-4-piperidyl)amino)-1,3,5-triazine-2-yl]-4,7-diazadecane-1,10-diamine, N,N',4-tris[4,6-bis(N-butyl-N-(1,2,2,6,6-pentamethyl-4-piperidyl)amino)-1,3,5-triazine-2-yl]-4,7-diazadecane-1,10-diamine and mixtures thereof, and the like, acrylate type photostabilizers such as ethyl α-cyano-β,β-diphenyl acrylate, isooctyl α-cyano-β,β-diphenyl acrylate, methyl α-carbomethoxy cinnamate, methyl α-cyano-β-methyl-p-methoxy cinnamate, butyl α-cyano-β-methyl-p-methoxy cinnamate, methyl α-carbomethoxy-p-methoxy cinnamate and N-(β-carbomethoxy-β-cyanovinyl)-2-methylindoline and mixtures thereof, and the like, nickel-based photostabilizers such as nickel complex of 2,2'-thiobis-[4-(1,1,3,3-tetramethylbutyl)phenol], nickeldibutyl dithiocarbamate, nickel salt of monoalkyl ester, nickel salt of ketoxime, and mixtures thereof, and the like, oxamide type photostabilizers such as 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and mixtures thereof, and the like, 2-(2-hydroxyphenyl)-1,3,5-triazine type photostabilizers such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyl-oxyphenyl)-4,6-bis(2,4-dimethylphenyl)-1,3,5-triazine, 2-[2-hydroxy-4-(2-hydroxy-3-butyl-oxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine and mixtures thereof, and the like.

Examples of the stabilizer include, also, hydroxyl amines such as N,N-dibenzylhydroxyamine, N,N-diethylhydroxyamine, N,N-dioctylhydroxyamine, N,N-dilaurylhydroxyamine, N,N-ditetradecylhydroxyamine, N,N-dihexadecylhydroxyamine, N,N-dioctadecylhydroxyamine, N-hexadecyl-N-octadecylhydroxyamine, N-heptadecyl-N-octadecylhydroxyamine and mixtures thereof, and the like, in addition to the above-described materials.

Examples of the lubricant include aliphatic hydrocarbons such as paraffin, wax and the like, higher aliphatic acids having 8 to 22 carbon atoms, salts of metals (Al, Ca, Mg, Zn) of higher aliphatic acids having 8 to 22 carbon atoms, aliphatic alcohols having 8 to 22 carbon atoms, polyglycols, esters of a higher fatty acid having 4 to 22 carbon atoms with an aliphatic monovalent alcohol having 4 to 18 carbon atoms, higher aliphatic amides having 8 to 22 carbon atoms, silicone oil, rosin derivatives and the like. Among additives other than the compound (1), preferably used are phenol type antioxidants, phosphorus-based antioxidants, sulfur-based antioxidants, ultraviolet absorbers and hindered amine type photostabilizers other than the compound (1).

Particularly preferable phenol type antioxidants other than the compound (1) include 2,6-di-t-butyl-4-methylphenol, 2,4,6-tri-t-butylphenol, 2,4-dioctylthiomethyl-6-methylphenol, 2,2'-thiobis(6-t-butylphenol), 4,4'-thiobis(3-methyl-6-t-butylphenol), 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol], 2,2'-methylenebis(4-methyl-6-cyclohexylphenol), 2,2'-methylenebis(4,6-di-t-butylphenol), 2,2'-ethylidenebis(4,6-di-t-butylphenol), 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 1,1,3-tris(5-t-butyl-4-hydroxy-2-methylphenyl)butane, ethylene glycol bis[3,3-bis-3'-t-butyl-4'-hydroxyphenyl] butyrate, 2,4,6-tris(3,5-di-t-butyl-4-phenoxy)-1,3,5-triazine, tris(4-t-butyl-3-hydroxy-2,6-dimethylbenzyl)isocyanurate, bis(3,5-di-t-butyl-4-hydroxybenzyl)isocyanurate, tris[2-(3',5'-di-t-butyl-4'-hydroxy-cinnamoyloxy)ethyl]isocyanurate, diethyl-3,5-di-t-butyl-4-hydroxybenzyl phosphonate, di-n-octadecyl-3,5-di-t-butyl-4-hydroxybenzyl phosphonate, calcium salt of 3,5-di-t-butyl-4-hydroxybenzylphosphonic acid monoester, n-octadecyl-3-(3,5-di-t-butyl-4-hydroxyphenyl)propionate, neopentanetetrayltetrakis(3,5-di-t-butyl-4-hydroxycinnamate), thiodiethylene-bis(3,5-di-t-butyl-4-hydroxycinnamate), 1,3,5-trimethyl-2,4,6-tris(3,5-di-t-butyl-4-hydroxybenzyl)benzene, 3,6-dioxaoctamethylenebis(3,5-di-t-butyl-4-hydroxycinnamate), hexamethylenebis(3,5-di-t-butyl-4-hydroxycinnamate), triethylene glycol bis(5-t-butyl-4-hydroxy-3-methyl cinnamate), 3,9-bis[2-(3-(3-t-butyl-4-hydroxy-5-methylphenyl)propionyloxy)-1,1-dimethylethyl]-2,4,8,10-tetraoxaspiro[5.5]undecane, N,N'-bis[3-(3',5'-di-t-butyl-4'-hydroxyphenyl)propionyl] hydrazine, N,N'-bis[3-(3',5'-di-t-butyl-4'-hydroxyphenyl)propionyl]hexamethylenediamine and the like, and these can be used singly or in combination of two or more.

Particularly preferable phosphorus-based antioxidants include tris(nonylphenyl)phosphite, tris(2,4-di-t-butylphenyl)phosphite, distearyl pentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, tetrakis(2,4-di-t-butyl-phenyl)-4,4'-diphenylene diphosphonite, 2,2'-methylenebis(4,6-di-t-butyl-phenyl) 2-ethylhexyl phosphite, 2,2'-ethylidenebis(4,6-di-t-butyl-phenyl)fluorophosphite, bis(2,4-di-t-butyl-6-methylphenyl)ethyl phosphite, 2-(2,4,6-tri-t-butyl-phenyl)-5-ethyl-5-butyl-1,3,2-oxaphosphorinane, 2,2',2''-nitrilo[triethyltris(3,3',5,5'-tetratbutyl-1,1'-biphenyl-2,2'-diyl) phosphite and the like, and these can be used singly or in combination of two or more.

Examples of preferable ultraviolet absorbers include phenyl salicylate, 4-t-butylphenyl salicylate, 2,4-di-t-butylphenyl 3',5'-di-t-butyl-4'-hydroxybenzoate, 4-t-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butyl-phenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole and the like, and these can be used singly or in combination of two or more.

Examples of preferable photostabilizers include bis(2,2,6,6-tetramethyl-4-piperidyl) sebacate, bis(1,2,2,6,6-pentamethyl-4-piperidyl) sebacate, bis(N-octoxy-2,2,6,6-tetramethyl-4-piperidyl) sebacate, bis(N-benzyloxy-2,2,6,6-tetramethyl-4-piperidyl) sebacate, bis(N-cyclohexyloxy-2,2,6,6-tetramethyl-4-piperidyl) sebacate, bis(1,2,2,6,6-pentamethyl-4-piperidyl)2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(2,2,6,6-tetramethyl-4-piperidyl)succinate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propionamide, tetrakis(2,2,6,6-tetramethyl-4-piperidyl) 1,2,3,4-butane tetracarboxylate;

tetrakis(1,2,6,6-pentamethyl-4-piperidyl) 1,2,3,4-butane tetracarboxylate; mixed esterified produced of 1,2,3,4-butanetetracarboxylic acid with 1,2,2,6,6-pentamethyl-4-piperidinol and 1-tridecanol; mixed esterified produced of 1,2,3,4-butanetetracarboxylic acid with 2,2,6,6-tetramethyl-4-piperidinol and 1-tridecanol; mixed esterified produced of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane; mixed esterified produced of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane; polycondensate of dimethyl succinate with 1-(2-hydroxy-ethyl)-4-hydroxy-2,2,6,6-tetramethylpiperidine; poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl-)-1,3,5-triazine-2,4-diyl)((2,2,6,6-tetramethyl-4-piperidyl)imino) hexamethylene((2,2,6,6-tetramethyl-4-piperidyl)imino)] and the like, and these can be used singly or in combination of two or more.

Regarding the above-described additives, there is, for example, a method in which the additive is dissolved in a hydrocarbon solvent together with the compound (1) in the second step, and mixed in the third step, in the above-described production method, or the like.

EXAMPLES

The present invention will be illustrated further in detail by examples and comparative examples mentioned below, but the present invention is not limited to them. Parts and % are by weight unless otherwise stated.

[Example 1]

(First Step)

According to the same manner as described in JP-A No. 1-168643, 1,3-butadiene and styrene were polymerized, then, methanol was added to de-activate a catalyst, and a cyclohexane solution of a styrene-butadiene copolymer was obtained.

(Second Step)

A kind of compound (1): 2-[1-(2-hydroxy-3,5-di-t-pentylphenyl)ethyl]-4,6-di-t-pentylphenyl acrylate (0.3 parts by weight) (hereinafter, referred to as compound (1-1) in some cases) was dissolved in about 1 part by weight of cyclohexane, to obtain a solution.

(Third Step)

The solution obtained in the second step was mixed in the cyclohexane solution of a styrene-butadiene copolymer obtained in the first step.

(Fourth Step)

The mixture obtained in the third step was subjected to flash distillation to remove most of cyclohexane, then, melt-kneaded by an extruder, then, extrusion-molded, to obtain pellets composed of cyclohexane and styrene-butadiene copolymer.

The above-described pellets were heated at 150° C. in Turbo Matrix manufactured by Perkin Elmer to evaporate cyclohexane contained, thereby measuring the weight reduction by distillation. Next, the pellets after distillation were applied to GC-MS (QP2010 manufactured by Shimadzu Corp.) to measure the content of cyclohexane. The content of cyclohexane contained in the pellets before distillation was 0.037 parts with respect to 100 parts of the styrene-butadiene copolymer, judging from the sum of the weight reduction by distillation and the above-described content.

Separately, the pellets obtained in the fourth step were dried at 80° C. in a reduced pressure drier, to obtain a thermoplastic polymer composition of the present invention. The content of cyclohexane was measured in the same manner as described above by GC-MS, to find that the content of cyclohexane was 0.007 parts with respect to 100 parts of the styrene-butadiene copolymer.

(Processing Stability Test)

The resin obtained in (Production Example 1 of thermoplastic polymer composition) was subjected to measurement of the melt flow rate (MFR) value under conditions of 280° C., 2.16 kg and a residence time of 15 minutes using Melt Indexer (L217-E14011, manufactured by TechnoSeven Co., Ltd.), to find a value of 9.2. When the thermoplastic polymer is a styrene-butadiene copolymer, larger the MFR value measured, higher processing stability.

(Blocking Resistance Test)

Fifteen grams of the above-described thermoplastic polymer composition in the form of pellet was weighed, and placed in a circular-cylindrical case having a cross-sectional area of 28.3 cm$^2$, and a weight of 2 kg was laid on this (71 g/cm$^2$). Under this condition, the composition was kept for 7 days in a constant temperature chamber of 25° C., then, the pressure was released, then, the state of mutual adhesion of the pellets was evaluated as described below.

○: pellets are not adhered, and return naturally to original condition when taken out from the case x: pellets are adhered, and do not return to original condition The pellets obtained in Example 1 were judged to ○.

Examples 2 to 4

Reference Examples 1 and 2

The pellets obtained in the fourth step of Example 1 were dried at 80° C. in a reduced pressure drier, until the cyclohexane content described in Table 1 was attained.

The results are shown in Table 1 together with those of Example 1.

In Reference Example 1, the pellets were dried almost completely over a period of 16 times in a reduced pressure drier, and thus obtained dried pellets were used. In Reference Example 2, the pellets obtained in the fourth step of Example 1 (pellets before distillation) were not dried in a reduced pressure drier, and used as they were.

TABLE 1

|  | | processing stability | |
| --- | --- | --- | --- |
| | cyclohexane content (parts) | blocking resistance | MFR value (280° C., 2.16 kg) | processing stability improvement ratio (%)[*1] |
| Example 1 | 0.0070 | ○ | 9.2 | 16 |
| Example 2 | 0.0046 | ○ | 9.1 | 16 |
| Example 3 | 0.0030 | ○ | 9.1 | 15 |
| Example 4 | 0.0010 | ○ | 8.8 | 12 |
| Reference Example 1 | 0.000053 | ○ | 7.9 | 0 |
| Reference Example 2 | 0.0370 | x | 10.3 | 30 |

[*1] processing stability improvement ratio(%) =
$$\frac{(\text{MFR value in example}) - (\text{MFR value in Reference Example 1})}{(\text{MFR value in Reference Example 1})} \times 100$$

Industrial Applicability

Thermoplastic polymer composition of the present invention can be suitably used for applications such as food packaging vessels, daily miscellaneous goods and the like because of excellent processing stability.

The invention claimed is:

1. A thermoplastic polymer composition comprising:
  a thermoplastic polymer,
  2-[1-(2-hydroxy-3,5-di-t-pentylphenyl)ethyl]-4,6-di-t-pentylphenyl acrylate, and an alicyclic hydrocarbon having 5 to 8 carbon atoms,
  wherein 0.001 to 3 parts by weight of 2-[1-(2 hydroxy-3,5-di-t-pentylphenyl)ethyl]-4,6-di-t-pentylphenyl acrylate and 0.0005 to 0.008 parts by weight of the hydrocarbon are contained with respect to 100 parts by weight of the thermoplastic polymer.

2. A method for producing a thermoplastic polymer composition comprising a thermoplastic polymer,
  2-[1-(2-hydroxy-3,5-di-t-pentylphenyl)ethyl]-4,6-di-t-pentylphenyl acrylate, and an alicyclic hydrocarbon having 5 to 8 carbon atoms, wherein the method comprises:
  a first step in which a monomer constituting the thermoplastic polymer is solution-polymerized or suspension-polymerized in the hydrocarbon to obtain the thermoplastic polymer,
  a second step in which 2-[1-(2-hydroxy-3,5-di-t-pentylphenyl)ethyl]-4,6-di-t-pentylphenyl acrylate is dissolved in the hydrocarbon,
  a third step in which the solution obtained in the above-described second step is mixed in a mixture of the hydrocarbon and the thermoplastic polymer obtained in the above-described first step so that the content of 2-[1-(2 hydroxy-3,5-di-t-pentylphenyl)ethyl]-4,6-di-t-pentylphenyl acrylate is 0.001 to 3 parts by weight with respect to 100 parts by weight of the thermoplastic polymer, and
  a fourth step in which the hydrocarbon is removed from the mixture of the thermoplastic polymer, the hydrocarbon and 2-[1-(2-hydroxy-3,5-di-t-pentylphenyl)ethyl]-4,6-di-t-pentylphenyl acrylate obtained in the above-described third step so as to adjust the content of the hydrocarbon in the resulting thermoplastic polymer composition to 0.0005 to 0.008 parts by weight with respect to 100 parts by weight of the thermoplastic polymer.

3. The thermoplastic polymer composition according to claim 1 wherein the composition is in the form of granule.

* * * * *